(12) United States Patent
Hirawaki

(10) Patent No.: US 12,545,129 B2
(45) Date of Patent: Feb. 10, 2026

(54) FUEL CELL VEHICLE

(71) Applicant: SUBARU CORPORATION, Tokyo (JP)

(72) Inventor: Aiko Hirawaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 315 days.

(21) Appl. No.: 18/206,827

(22) Filed: Jun. 7, 2023

(65) Prior Publication Data

US 2024/0010080 A1     Jan. 11, 2024

(30) Foreign Application Priority Data

Jul. 6, 2022  (JP) .................................. 2022-109036

(51) Int. Cl.
| | |
|---|---|
| *B60L 50/71* | (2019.01) |
| *B60K 1/04* | (2019.01) |
| *B62D 21/15* | (2006.01) |

(52) U.S. Cl.
CPC ................ *B60L 50/71* (2019.02); *B60K 1/04* (2013.01); *B62D 21/152* (2013.01); *B60K 2001/0411* (2013.01); *B60L 2210/40* (2013.01)

(58) Field of Classification Search
CPC .. B60L 50/66; B60L 50/71; B60K 2001/0411; B62D 21/15

See application file for complete search history.

(56) References Cited

U.S. PATENT DOCUMENTS

| | | | | |
|---|---|---|---|---|
| 5,476,151 | A * | 12/1995 | Tsuchida .............. | B62D 21/152 180/274 |
| 6,371,229 | B1 * | 4/2002 | Kakiuchi ............. | B60K 5/1208 180/68.5 |
| 6,722,696 | B2 * | 4/2004 | Sonomura ........... | B60K 5/1216 180/312 |
| 6,827,168 | B2 * | 12/2004 | Miyazaki ............... | B60R 19/00 180/274 |
| 7,144,039 | B2 * | 12/2006 | Kawasaki .............. | B60L 50/71 280/124.109 |
| 7,588,117 | B2 * | 9/2009 | Fukuda ................ | B62D 21/155 180/291 |
| 7,886,861 | B2 * | 2/2011 | Nozaki .................... | B60K 1/00 280/783 |
| 9,079,508 | B2 * | 7/2015 | Naito ...................... | B60L 1/003 |
| 9,199,537 | B2 * | 12/2015 | Hotta ..................... | B60L 58/30 |
| 9,371,009 | B2 * | 6/2016 | Ishikawa ............. | H01M 8/2457 |
| 9,630,501 | B2 * | 4/2017 | Shiba ....................... | B60K 6/48 |
| 9,895,999 | B2 * | 2/2018 | Ohashi .................... | B60K 1/04 |
| 9,937,780 | B2 * | 4/2018 | Murata .................... | B60K 1/04 |

(Continued)

FOREIGN PATENT DOCUMENTS

JP         2018-99918 A      6/2018

*Primary Examiner* — Jeffrey J Restifo
(74) *Attorney, Agent, or Firm* — McGinn IP Law Group, PLLC

(57) ABSTRACT

A fuel cell vehicle includes a fuel cell, a drive motor, and a drive unit. The drive motor is configured to be driven with electricity of the fuel cell. The drive unit is configured to transmit driving force from the drive motor. The fuel cell, the drive motor, and the drive unit are disposed in a front space of the vehicle. The fuel cell is mounted via a first frame coupled to a body. The drive motor and the drive unit are mounted via a second frame that is coupled to the body and that is different from the first frame.

20 Claims, 6 Drawing Sheets

(56) References Cited

U.S. PATENT DOCUMENTS

| | | | |
|---|---|---|---|
| 9,941,495 B2* | 4/2018 | Naito | B60L 50/71 |
| 10,093,183 B2* | 10/2018 | Murata | B60H 1/00392 |
| 10,189,353 B2* | 1/2019 | Sakamoto | B60K 28/14 |
| 10,279,693 B2* | 5/2019 | Shimizu | B60L 50/66 |
| 10,518,620 B2* | 12/2019 | Yamafuji | B60K 1/04 |
| 10,525,840 B2* | 1/2020 | Takeyama | H01M 8/1018 |
| 10,608,262 B2* | 3/2020 | Nishiumi | H01M 8/04 |
| 10,654,367 B2* | 5/2020 | Ichida | B60L 50/71 |
| 10,766,348 B2* | 9/2020 | Fukui | B62D 21/09 |
| 10,919,576 B2* | 2/2021 | Nishiumi | B62D 21/11 |
| 11,014,458 B2* | 5/2021 | Yoshikawa | B62D 25/082 |
| 11,027,679 B2* | 6/2021 | Yuki | H05K 5/0204 |
| 11,040,629 B2* | 6/2021 | Sakakibara | B60K 11/02 |
| 11,305,628 B2* | 4/2022 | Tanaka | B60K 1/04 |
| 11,367,882 B2* | 6/2022 | Yoshitomi | H01M 8/2465 |
| 11,970,211 B2* | 4/2024 | Isakiewitsch | B62D 21/15 |
| 12,059,949 B2* | 8/2024 | Nakagawa | B60K 1/04 |
| 2004/0090085 A1* | 5/2004 | Kawasaki | B60L 50/66 296/187.09 |
| 2015/0251560 A1* | 9/2015 | Ishikawa | B62D 21/15 429/469 |
| 2017/0096067 A1* | 4/2017 | Murata | H01M 8/04029 |
| 2017/0101031 A1* | 4/2017 | Ohashi | B60K 15/03006 |
| 2017/0117570 A1* | 4/2017 | Ishikawa | H01M 8/2475 |
| 2018/0170211 A1 | 6/2018 | Yoshikawa et al. | |
| 2018/0178641 A1* | 6/2018 | Yamafuji | H01M 8/247 |
| 2018/0297461 A1* | 10/2018 | Tambo | B60L 3/0007 |
| 2018/0304767 A1* | 10/2018 | Ichida | B60L 3/0007 |
| 2020/0361317 A1* | 11/2020 | Peirone | B60L 3/0007 |
| 2021/0005908 A1* | 1/2021 | Yoshitomi | B60L 58/30 |
| 2022/0363119 A1* | 11/2022 | Nakagawa | B62D 25/082 |
| 2024/0010080 A1* | 1/2024 | Hirawaki | B60L 3/0007 |

* cited by examiner

FUEL CELL VEHICLE

CROSS-REFERENCE TO RELATED APPLICATIONS

The present application claims priority from Japanese Patent Application No. 2022-109036 filed on Jul. 6, 2022, the entire contents of which are hereby incorporated by reference.

BACKGROUND

The disclosure relates to a fuel cell vehicle including a fuel cell.

Automobiles have been used for transportation in modern society. Various vehicles move on roads every day. In recent years, development of fuel cell vehicles including fuel cells whose environmental load is relatively low has advanced.

Such a fuel cell vehicle includes a hydrogen tank and a fuel cell module configured to generate electricity by receiving hydrogen supplied from the hydrogen tank. For example, Japanese Unexamined Patent Application Publication (JP-A) No. 2018-99918 proposes collision avoidance measures that enable avoidance of collision between a fuel cell module and a hydrogen tank when a load is applied in the longitudinal direction of a vehicle.

SUMMARY

An aspect of the disclosure provides a fuel cell vehicle including a fuel cell, a drive motor, and a drive unit. The drive motor is configured to be driven with electricity of the fuel cell. The drive unit is configured to transmit driving force from the drive motor. The fuel cell, the drive motor, and the drive unit are disposed in a front space of the vehicle. The fuel cell is mounted via a first frame coupled to a body. The drive motor and the drive unit are mounted via a second frame that is coupled to the body and that is different from the first frame.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
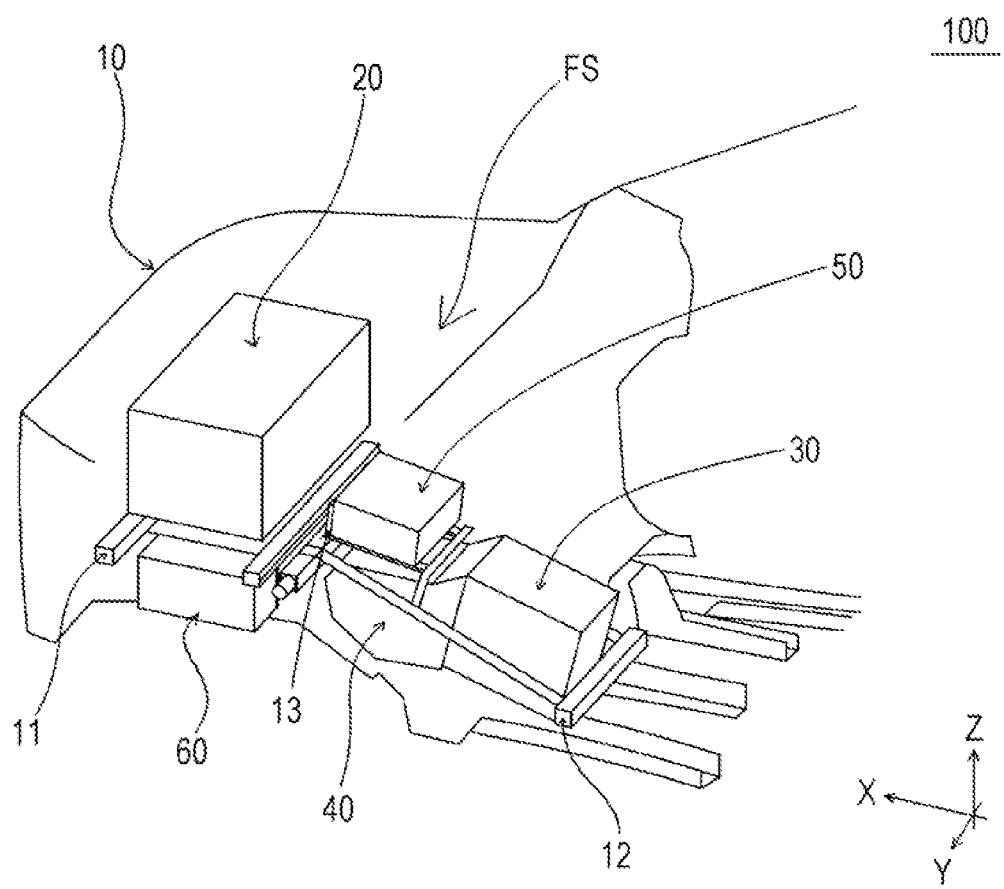
FIG. 1 is a perspective view of a holding mechanism and a front part of a body of a fuel cell vehicle according to an embodiment of the disclosure.

Existing techniques including the technique in JP-A No. 2018-99918 do not satisfy market demands appropriately and have the following issue.

That is, in addition to the hydrogen tank and the fuel cell module, a fuel cell vehicle includes an electric motor configured to be driven with electricity of a fuel cell thereof, and a drive unit such as a gearbox configured to transmit driving force of the electric motor to wheels.

The configuration proposed in JP-A No. 2018-99918 forms a rear-wheel drive structure in which the electric motor is disposed in the rear part of the vehicle. However, JP-A No. 2018-99918 does not necessarily propose an optimum disposition for, for example, a front-wheel drive or a four-wheel drive. Thus, there is yet large room for improvement in the configuration of a fuel cell vehicle having a front-wheel drive or a four-wheel drive, the configuration including an electric motor and a drive unit in addition to a fuel cell module.

It is desirable to provide a fuel cell vehicle in which a drive unit and an electric motor, in addition to a fuel cell module, are disposed in a front space of the vehicle and that employs collision avoidance measures.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description, for convenience, the height direction of the fuel cell vehicle is defined as the Z direction, the longitudinal direction of the fuel cell vehicle is defined as the X direction, and the width direction of the fuel cell vehicle orthogonal to the Z direction and the X direction is defined as the Y direction. However, the disclosure is not affected by the definitions of the directions described above, and the definitions do not improperly restrict aspects of the disclosure. Configurations other than those to be described in detail later may be appropriately supplemented by a frame structure, onboard equipment, and elemental techniques thereof regarding any of publicly known fuel cell vehicles including the fuel cell vehicle in JP-A No. 2018-99918.

Fuel Cell Vehicle 100

The configuration of a fuel cell vehicle 100 of an embodiment will be described with reference to FIGS. 1 to 3.

As illustrated in FIG. 1, the fuel cell vehicle 100 is formed by having a front space FS, which is disposed in a hood (not illustrated) of a body 10, the hood being located in a front part of the vehicle. For example, a fuel cell 20, a drive motor 30, a drive unit 40, a high-voltage component 50, and accessories 60 are mounted in the front space FS via respective frame members (described later) coupled to the body 10.

In addition to the above components, the fuel cell vehicle 100 includes various pieces of equipment such as a publicly known hydrogen tank (not illustrated) configured to supply a fuel gas to the fuel cell 20, and a publicly known onboard battery (not illustrated) configured to store, as necessary, electricity generated by, for example, the fuel cell 20.

A front-wheel drive vehicle configured to transmit driving force from the drive unit 40 to front wheels will be illustrated below as the fuel cell vehicle 100 of the embodiment. However, the fuel cell vehicle 100 is not limited to the front-wheel drive vehicle and may be a rear-wheel drive vehicle configured to transmit driving force to rear wheels or a four-wheel drive vehicle in which respective drive units are provided in a front part and a rear part of the vehicle.

The fuel cell 20 may be formed as a publicly known fuel cell module provided with, for example, a fuel cell stack formed by stacking single cells of a publicly known polymer electrolyte fuel cell (PEFC), and a cooling circuit therefor. As illustrated in FIGS. 1 and 2, for example, the fuel cell 20 is mounted via a first frame 11, which is coupled to the body 10 of the vehicle. As can be seen from these figures, the first frame 11 is formed as a cross member having ends coupled to respective sides of the body via publicly known fixing members.

Detailed Structure of First Frame 11

Figure 2:
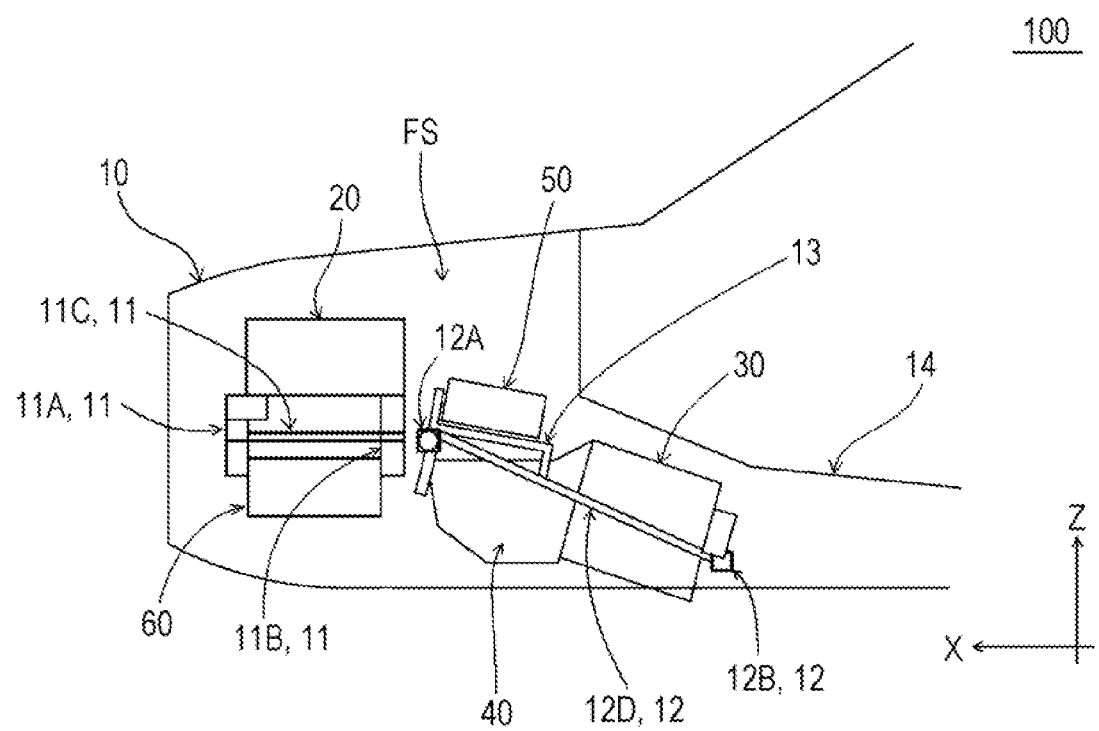
FIG. 2 is a schematic side view of the holding mechanism and the front part of the body of the fuel cell vehicle of the embodiment.
Figure 6A:
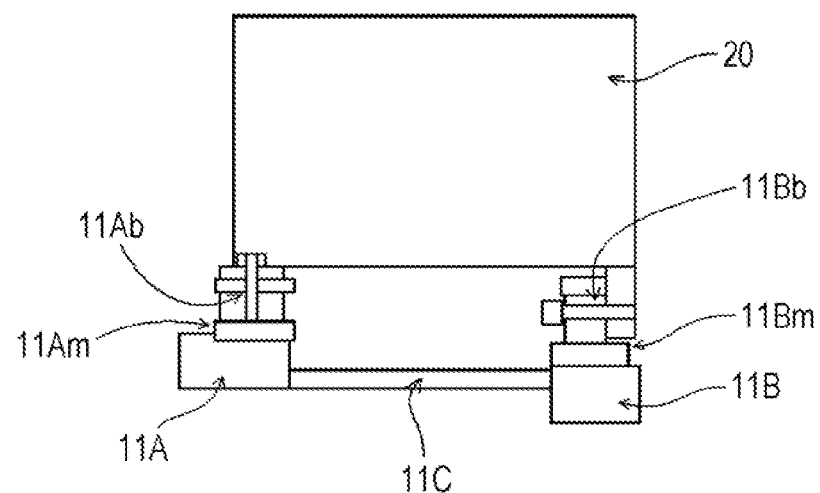
FIGS. 6A and 6B are third schematic views illustrating a state transition of the holding structure at the time of the front collision.
Figure 6B:
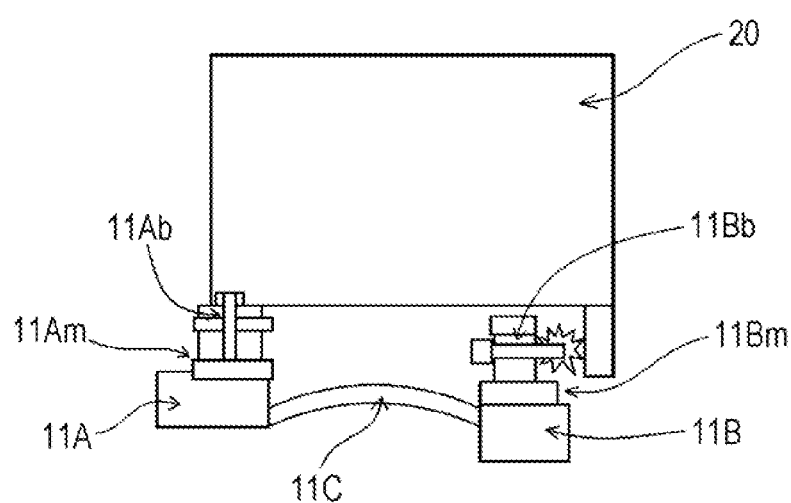

As illustrated in FIGS. 2, 6A, and 6B, for example, the fuel cell 20 is supported by a first cross member 11A, which is disposed at the front of the first frame 11 in the longitudinal direction of the vehicle, and a second cross member 11B, which is disposed behind the first cross member 11A. For example, as can be seen from FIGS. 6A and 6B, the front side of the fuel cell 20 may be fixed via a front bracket 11Ab, which is provided on a front mount 11Am of the first cross member 11A, and the rear side of the fuel cell may be fixed via a rear bracket 11Bb, which is provided on a rear mount 11Bm of the second cross member 11B.

The structure of and the material for each of the front mount 11Am and the rear mount 11Bm of the embodiment are not particularly limited as long as the fuel cell 20 can be mounted thereon, and a publicly known mount mechanism as illustrated in JP-A No. 2018-99918 may be applied thereto.

On the other hand, as illustrated in FIGS. 6A and 6B, in the embodiment, the front bracket 11Ab and the rear bracket 11Bb, with which the fuel cell 20 is fixed, may be formed so as to be different from each other in the strength to fix the fuel cell 20. That is, the fuel cell 20 may be fixed with the front bracket 11Ab and the rear bracket 11Bb such that the fuel cell 20 fixed with the rear bracket 11Bb is released by priority from the rear bracket 11Bb while the fuel cell 20 is kept fixed with the front bracket 11Ab when the first frame 11 is impacted, for example, at the time of a front collision.

In an example in which the rear bracket 11Bb is broken by priority, the fuel cell 20 may be fixed with the front bracket 11Ab by being fastened with a bolt in the vertical direction, whereas the fuel cell 20 may be fastened to the rear bracket 11Bb with a bolt in the longitudinal direction of the vehicle such that the bolt is removed at the time of the impact. Alternatively, in another example in which the rear bracket 11Bb is broken by priority, the strength and the rigidity of the bolt used in the rear bracket 11Bb may be set to be lower than those of the bolt used in the front bracket 11Ab. Thus, when the first frame 11 is impacted, for example, at the time of a front collision, the rear bracket 11Bb can be broken earlier than the front bracket 11Ab.

In addition, as illustrated in FIGS. 6A and 6B, the first cross member 11A and the second cross member 11B, which extend parallel to each other in the width direction of the vehicle, are coupled by a coupling piece 11C, which is interposed therebetween. The coupling piece 11C may be coupled to the first cross member 11A and the second cross member 11B by a publicly known fixing method such as welding or fastening.

The first cross member 11A and the second cross member 11B may be made of a publicly known steel material. On the other hand, the rigidity of the coupling piece 11C of the embodiment may be set to be lower than the rigidity of the first cross member 11A and the second cross member 11B. Instead, the coupling piece 11C of the embodiment may have an inflection region bent so as to cross the longitudinal direction of the vehicle. Thus, as described below, when the first frame 11 is impacted, for example, at the time of a front collision, the rear bracket 11Bb can be broken to downsize and deform the entire first frame 11 in the longitudinal direction of the vehicle.

As illustrated in FIGS. 1 and 2, for example, the drive motor 30, which is configured to be driven with electricity of the fuel cell, and the drive unit 40, which is configured to transmit driving force from the drive motor 30, are disposed in the front space FS so as to be located behind the fuel cell 20 in the longitudinal direction of the vehicle. For example, the drive motor 30 and the drive unit 40 of the embodiment may be mounted via a second frame 12, which is coupled to the body 10 of the vehicle and is different from the first frame 11.

Detailed Structure of Second Frame 12

Figure 3:
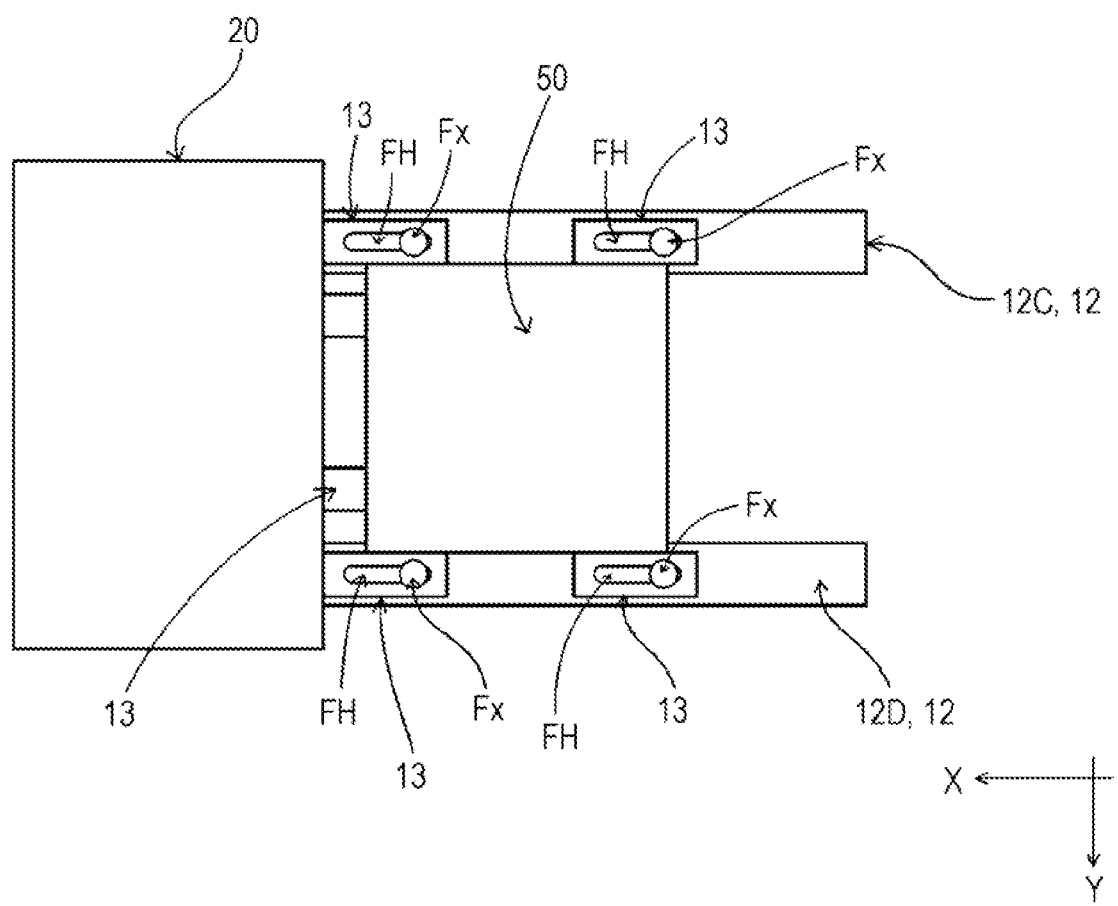
FIG. 3 is a schematic top view of the holding mechanism according to the embodiment.

As can be seen from FIGS. 1 to 3, for example, the second frame 12 is formed by including a cross member that is disposed behind the first frame 11 in the longitudinal direction of the vehicle and that has ends coupled to the respective sides of the body 10 via publicly known fixing members.

For example, the second frame 12 may be formed by including a third cross member 12A and a fourth cross member 12B, which extend in the width direction of the vehicle and each of which has ends coupled to the respective sides of the body 10, and a first side member 12C and a second side member 12D, which extend in the longitudinal direction of the vehicle and each of which has respective ends coupled to the third cross member 12A and the fourth cross member 12B.

As illustrated in FIG. 2, the third cross member 12A out of these members may be disposed so as to be located in front of the fourth cross member 12B in the longitudinal direction of the vehicle and to be located above the fourth cross member 12B in the vertical direction. In other words, as can be seen from the figure, the first side member 12C and the second side member 12D may be disposed obliquely such that the front side of each of the first side member 12C and the second side member 12D is located above in the vertical direction. That is, a rear part of the front space FS is divided from a floor (part under the floor) of a vehicle cabin, and, as illustrated in FIG. 2, for example, the second frame 12 of the embodiment may be disposed obliquely under a floor tunnel 14, which is located at the center of the floor.

The drive motor 30 and the drive unit 40 are fixed so as to be interposed between the first side member 12C and the second side member 12D. The method for fixing the drive motor 30 and the drive unit 40 to these side members is not particularly limited, and, for example, a fastening method using bolts or a fixing method by welding or using an adhesive may be applied thereto.

As can be seen from FIG. 1, for example, the fuel cell the drive unit 40, and the drive motor 30 of the embodiment are disposed in this order from the front to the rear of the vehicle to achieve a collision avoidance operation to be described below.

The drive motor 30 is not particularly limited, and various publicly known electric motors to be mounted in fuel cell vehicles may be applied as examples of the drive motor Publicly known driving force transmission mechanisms such as a gearbox configured to transmit driving force from the drive motor 30 to wheels can be illustrated as examples of the drive unit 40.

Detailed Structure of Third Frame 13

As illustrated in FIGS. 1 and 2, for example, the fuel cell vehicle 100 of the embodiment may be formed by further including a third frame 13, which is fixed onto the second frame 12 via fixing members Fx. The high-voltage component 50, which is configured to drive the drive motor 30, is mounted on the third frame 13. A publicly known inverter can be illustrated as the high-voltage component 50 of the embodiment, but other publicly known high-voltage components for fuel cell vehicles may be applied as examples of the high-voltage component 50. In the embodiment, the high-voltage component 50 is an inverter. Thus, it can also be said that the third frame 13 is a dedicated frame for an inverter.

Publicly known fasteners such as fastening bolts can be illustrated as examples of the fixing members Fx. In a configuration in which the third frame 13 is fixed to the second frame 12, as illustrated in FIG. 3, the first side member 12C and the second side member 12D may have fixing holes FH, into which the fastening bolts can be inserted, and the bottom of the third frame may be fixed to the first side member 12C and the second side member 12D via the fixing members Fx.

The fixing holes FH, which are provided at the respective top sides of the first side member 12C and the second side member 12D, may be elongated holes or elliptical holes whose major axes are parallel to the longitudinal direction of the vehicle. Thus, the third frame 13 collided with the fuel cell 20 at the time of a collision to be described below is capable of sliding in the fixing holes FH.

Configuration of Accessories 60

As illustrated in FIGS. 1 and 2, for example, the accessories 60 for driving the fuel cell 20 may be fixed under the first frame 11 via a publicly known mount mechanism. The accessories 60 include electrical accessories 60A such as a converter and an electric pump, which are to be protected at the time of a collision, and a non-electrical accessory 60B such as an intercooler, which is not necessarily to be protected at the time of a collision.

Figure 4:
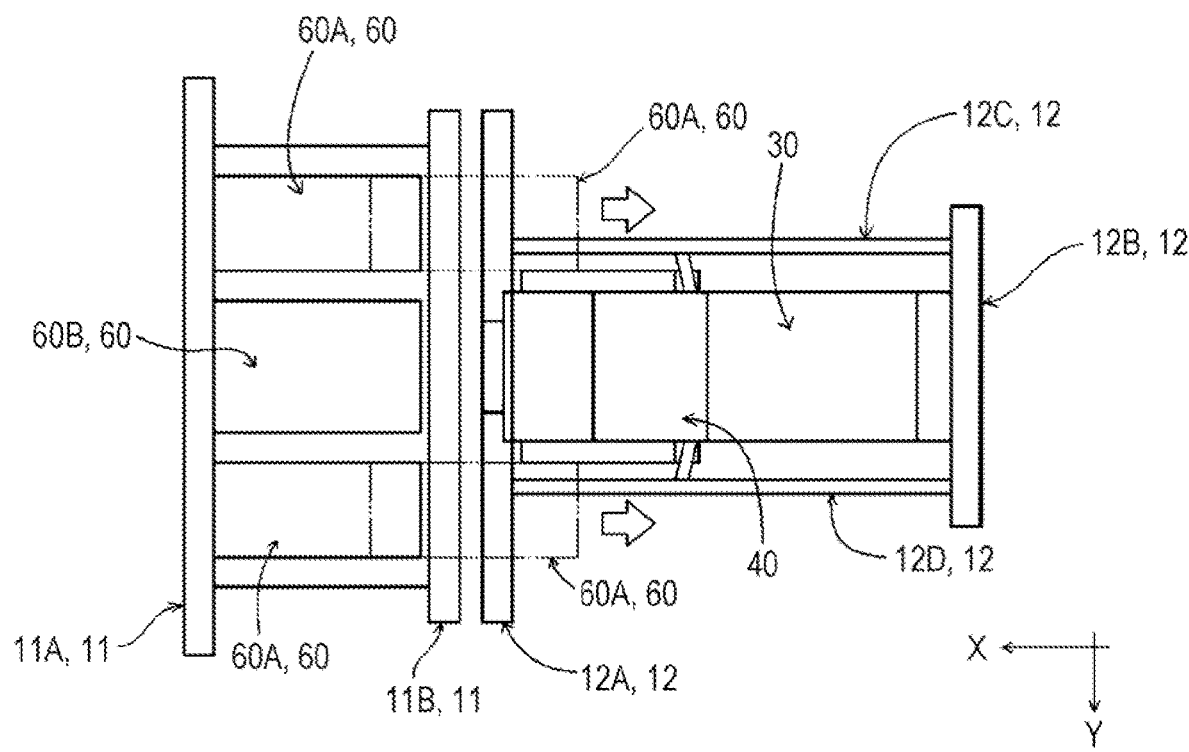
FIG. 4 is a first schematic view illustrating a state transition of a holding structure at the time of a front collision.

As can be seen from FIG. 4, the electrical accessories which are to be protected at the time of a collision, of the accessories 60 of the embodiment may be disposed at respective sides of the first frame 11 in the width direction of the vehicle so as not to overlap the drive unit in the longitudinal direction of the vehicle. On the other hand, the non-electrical accessory 60B of the accessories 60 of the embodiment may be disposed at the center of the first frame 11 in the width direction of the vehicle so as to overlap the drive unit 40 in the longitudinal direction of the vehicle.

In this manner, in the fuel cell vehicle 100 of the embodiment, the accessories 60 may be mounted at respective positions that are located under the first frame 11 and the fuel cell 20, and the electrical accessories of the accessories may be disposed such that the position where the drive unit 40 is installed and the positions where the electrical accessories are installed are shifted from each other in the width direction of the vehicle so as not to overlap each other in the longitudinal direction of the vehicle. Thus, similarly to the fuel cell 20, the accessories 60 move so as to slide rearward via the first frame 11, for example, at the time of a collision to be described below. However, the electrical accessories 60A and the drive unit 40 do not overlap each other in the longitudinal direction of the vehicle, thus enabling avoidance of collision therebetween.

State Transition of Fuel Cell Vehicle 100 at Time of being Impacted in Longitudinal Direction of Vehicle Next, a state transition of the fuel cell vehicle 100 of the embodiment at the time of being impacted in the longitudinal direction of the vehicle will be described with further reference to FIGS. 4 to 6B. Hereinafter, a front collision that is a collision of the fuel cell vehicle 100 with an obstacle existing in front of the fuel cell vehicle 100 is described as an example of "impact in the longitudinal direction of the vehicle". However, the embodiment is not limited to this example, and a rear collision that is a collision of the fuel cell vehicle 100 with an obstacle existing behind the fuel cell vehicle 100 may be an example of the "impact in the longitudinal direction of the vehicle".

That is, when the fuel cell vehicle 100 has a front collision, the impact is transmitted to the first frame 11 via the body 10, and an inertial force resulting from the impact is also applied to the fuel cell 20. As described above, in the embodiment, the fuel cell 20 fixed with the rear bracket 11Bb is released by priority from the rear bracket 11Bb while the fuel cell 20 is kept fixed with the front bracket 11Ab when the first frame 11 is impacted. In addition, the rigidity of the coupling piece 11C is set to be lower than the rigidity of the first cross member 11A and the second cross member 11B.

Then, as illustrated in FIGS. 6A and 6B, the fuel cell fixed with the rear bracket 11Bb, which supports the fuel cell 20, is first released by priority from the rear bracket 11Bb. Subsequently, the fuel cell 20 is moved toward the rear of the vehicle by application of the inertial force, and a part (coupling piece 11C in the embodiment) of the first frame 11 is downsized and deformed in the longitudinal direction of the vehicle. Thus, first, it is possible to reduce damage to the fuel cell 20 and deformation of the fuel cell 20 at the time of a front collision.

In this case, as illustrated in FIG. 4, the electrical accessories 60A of the embodiment are disposed at the respective sides of the first frame 11 in the width direction of the vehicle so as not to overlap the drive unit in the longitudinal direction of the vehicle. In addition, as illustrated in the figure, the high-voltage component 50 mounted on the third frame 13 may be disposed above the accessories 60 in the vertical direction. Thus, it is also possible to reduce the contact between the high-voltage component 50 and the accessories 60 at the time of a collision as much as possible.

Figure 5A:
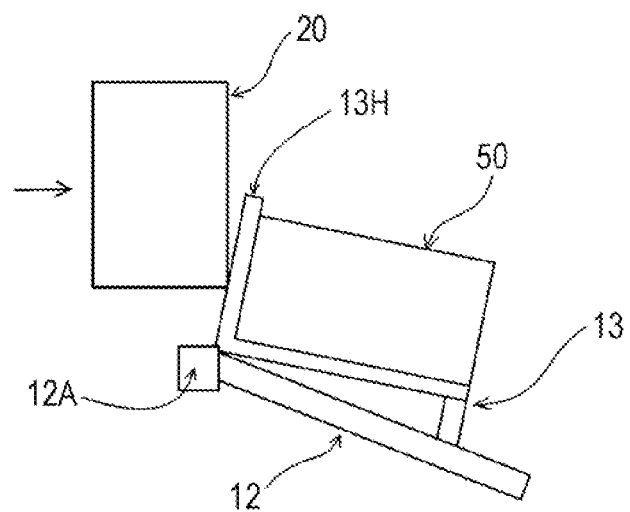
FIGS. 5A and 5B are second schematic views illustrating a state transition of the holding structure at the time of the front collision.

When the fuel cell 20 is moved toward the rear of the vehicle by an impact in the longitudinal direction of the vehicle, as illustrated in FIG. 5A, the fuel cell 20 comes into contact with the third frame 13, on which the high-voltage component 50 is mounted. In this manner, the third frame 13 of the embodiment may be formed by including a front plate 13H, which is interposed between the fuel cell and the high-voltage component 50. Thus, it is possible to avoid the direct contact between the fuel cell 20 and the high-voltage component 50 at the time of a collision and to inhibit excessive damage from being caused at the time of the collision.

Figure 5B:
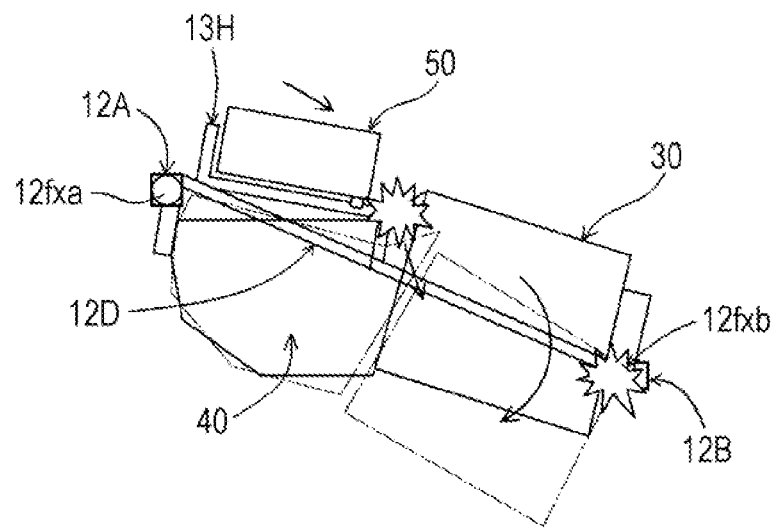

When the fuel cell 20 comes into contact with the third frame 13, the fixing members Fx for the third frame 13, on which the high-voltage component 50 is mounted, are broken to move the third frame 13 toward the rear of the vehicle. Then, as illustrated in FIG. 5B, the third frame 13 moved toward the rear of the vehicle comes into contact with the drive motor 30, and a coupling part 12*fxb*, which is coupled to the body 10, of the fourth cross member 12B of the second frame 12 is broken due to, for example, an impact caused by the contact of the third frame 13. Thus, the coupling part 12*fxb*, which is coupled to the body 10 and is located closer to the rear of the vehicle, of the second frame 12 is broken at the time of a front collision, thus enabling the second frame 12 to turn around a coupling part 12*fxa*, which is coupled to the body 10 and is located closer to the front of the vehicle.

In this manner, in the embodiment, the drive unit 40 and the drive motor 30 are disposed in this order from the front in the longitudinal direction of the vehicle. In addition, at least a part of the drive unit 40 and the drive motor 30 may be disposed obliquely under the floor tunnel of the vehicle existing behind the front space FS.

The fuel cell 20, the drive motor 30, and the drive unit 40 may be fixed, via respective mount mechanisms, to respective dedicated frames (the first frame 11 and the second frame 12 in the embodiment) coupled to the body 10. In addition, in the embodiment, the high-voltage component 50 (inverter) fixed to the dedicated third frame 13 may be disposed above the drive unit 40. The third frame 13 may be fixed to the fixing holes FH (for example, elongated holes), which are provided in the second frame 12 and are parallel to the longitudinal direction of the vehicle, via the fixing members Fx.

At the time of being impacted in the longitudinal direction of the vehicle due to, for example, a front collision, the third frame 13 is pushed by the fuel cell 20 moved rearward and is allowed to move such that at least a part of the third frame 13 enters a space under the floor tunnel along the inclination of the second frame 12. When the third frame 13 moves rearward so as to come into contact with the drive unit 40, a collision load is applied from the third frame 13 to the drive unit 40 to break the coupling part 12*fxb*, which is coupled to the body 10 and is located closer to the rear of the vehicle, of the second frame 12.

Then, the drive motor 30 is cantilevered around the coupling part 12*fxa*, which is coupled to the body 10 and is located closer to the front of the vehicle, and a part of the second frame 12 closer to the rear of the vehicle falls down (turns) around the coupling part 12*fxa* due to the self-weight. Thus, a predetermined space is formed between the drive motor 30 and the floor tunnel 14. As a result, it is possible to avoid collision with the fuel cell 20 such that the high-voltage component 50 enters this space.

According to the embodiment of the disclosure, even when a load is applied in the longitudinal direction of the vehicle, it is possible to reduce damage to the fuel cell module, the electric motor, and the drive unit that are disposed in the front part of the vehicle.

The desirable embodiment of the disclosure has been described above in detail with reference to the accompanying drawings, but the disclosure is not limited to the embodiment. It is obvious that those who have ordinary knowledge in the technical field of the disclosure modify the embodiment within the technical idea of the aspect of the disclosure. It is clear that such modifications are also included in the technical scope of the disclosure.

The invention claimed is:

1. A fuel cell vehicle comprising:
   a fuel cell;
   a drive motor configured to be driven with electricity of the fuel cell; and
   a drive unit configured to transmit driving force from the drive motor, wherein
   the fuel cell, the drive motor, and the drive unit are disposed in a front space of the vehicle,
   the fuel cell is mounted via a first frame coupled to a body,
   the drive motor and the drive unit being mounted via a second frame that is coupled to the body and that is different from the first frame, the second frame being disposed behind the first frame in a longitudinal direction of the body.

2. The fuel cell vehicle according to claim 1, wherein
   the fuel cell, the drive unit, and the drive motor are disposed in this order from a front to a rear of the fuel cell vehicle,
   the first frame is disposed so as to be capable of being downsized and deformed in a longitudinal direction of the fuel cell vehicle when a rear bracket is broken at a time of a front collision, and
   the second frame is disposed so as to turn around a coupling part that is coupled to the body and that is located closer to the front of the fuel cell vehicle when a coupling part that is coupled to the body and that is located closer to the rear of the fuel cell vehicle is broken at the time of the front collision.

3. The fuel cell vehicle according to claim 2, wherein the second frame is disposed obliquely under a floor tunnel of the body.

4. The fuel cell vehicle according to claim 1, wherein
   accessories are disposed below a portion of the first frame on which the fuel cell is provided, and
   an electrical accessory of the accessories is disposed such that a position where the drive unit is installed and a position where the electrical accessory is installed are shifted from each other in a width direction of the fuel cell vehicle so as not to overlap each other in a longitudinal direction of the fuel cell vehicle.

5. The fuel cell vehicle according to claim 4, wherein the second frame is disposed obliquely under a floor tunnel of the body.

6. The fuel cell vehicle according to claim 4, wherein
   the second frame is disposed behind the first frame in a longitudinal direction of the body from a front to a rear of the fuel cell vehicle.

7. The fuel cell vehicle according to claim 1, wherein
   the fuel cell, the drive unit, and the drive motor are disposed in this order from a front to a rear of the fuel cell vehicle.

8. The fuel cell vehicle according to claim 1, wherein
   the first frame is disposed so as to be capable of being downsized and deformed in a longitudinal direction of the fuel cell vehicle when a rear bracket is broken at a time of a front collision.

9. The fuel cell vehicle according to claim 1, wherein
   the second frame is disposed so as to turn around a coupling part that is coupled to the body and that is located closer to the front of the fuel cell vehicle when a coupling part that is coupled to the body and that is located closer to the rear of the fuel cell vehicle is broken at the time of the front collision.

10. The fuel cell vehicle according to claim 1, wherein
    the fuel cell, the drive unit, and the drive motor are disposed in this order from a front to a rear of the fuel cell vehicle,
    the first frame is disposed so as to be capable of being downsized and deformed in a longitudinal direction of the fuel cell vehicle when a rear bracket is broken at a time of a front collision.

11. The fuel cell vehicle according to claim 1, wherein
    the fuel cell, the drive unit, and the drive motor are disposed in this order from a front to a rear of the fuel cell vehicle, and the second frame is disposed so as to turn around a coupling part that is coupled to the body and that is located closer to the front of the fuel cell vehicle when a coupling part that is coupled to the body and that is located closer to the rear of the fuel cell vehicle is broken at the time of the front collision.

12. The fuel cell vehicle according to claim 1, wherein accessories are disposed below a portion of the first frame on which the fuel cell is provided.

13. The fuel cell vehicle according to claim 1, wherein an electrical accessory of the accessories is disposed such that a position where the drive unit is installed and a position where the electrical accessory is installed are shifted from each other in a width direction of the fuel cell vehicle so as not to overlap each other in a longitudinal direction of the fuel cell vehicle.

14. The fuel cell vehicle according to claim 1, wherein the fuel cell is mounted ahead of the drive unit and the driver motor from a front to a rear of the fuel cell vehicle.

15. The fuel cell vehicle according to claim 1, wherein a start of the second frame is disposed behind a start of the first frame in a longitudinal direction of the body.

16. The fuel cell vehicle according to claim 1, wherein the second frame being disposed entirely behind the first frame in a longitudinal direction of the body.

17. The fuel cell vehicle according to claim 1, wherein the second frame is disposed behind the first frame in a longitudinal direction of the body from a front to a rear of the fuel cell vehicle.

18. A fuel cell vehicle comprising:
a fuel cell;
a drive motor configured to be driven with electricity of the fuel cell;
a drive unit configured to transmit driving force from the drive motor, wherein
the fuel cell, the drive motor, and the drive unit are disposed in a front space of the vehicle,
the fuel cell is mounted via a first frame coupled to a body,
the drive motor and the drive unit being mounted via a second frame that is coupled to the body and that is different from the first frame; and
a third frame on which a high-voltage component configured to drive the drive motor is mounted, the third frame being fixed onto the second frame via a fixing member.

19. The fuel cell vehicle according to claim 18, wherein the second frame is disposed obliquely under a floor tunnel of the body.

20. A fuel cell vehicle comprising:
a fuel cell;
a drive motor configured to be driven with electricity of the fuel cell; and
a drive unit configured to transmit driving force from the drive motor, wherein
the fuel cell, the drive motor, and the drive unit are disposed in a front space of the vehicle,
the fuel cell is mounted via a first frame coupled to a body,
the drive motor and the drive unit being mounted via a second frame that is coupled to the body and that is different from the first frame, and
the second frame is disposed obliquely under a floor tunnel of the body.

* * * * *